(12) United States Patent
Zenginler et al.

(10) Patent No.: US 11,853,910 B2
(45) Date of Patent: Dec. 26, 2023

(54) RANKING ACTION SETS COMPRISED OF ACTIONS FOR AN EVENT TO OPTIMIZE ACTION SET SELECTION

(71) Applicant: International Business Machines Corporation, Armonk, NY (US)

(72) Inventors: Tansel Zenginler, Istanbul (TR); Natalie Brooks Powell, Bolingbrook, IL (US); Vinod A. Valecha, Pune (IN)

(73) Assignee: INTERNATIONAL BUSINESS MACHINES CORPORTION, Armonk, NY (US)

( * ) Notice: Subject to any disclaimer, the term of this patent is extended or adjusted under 35 U.S.C. 154(b) by 950 days.

(21) Appl. No.: 16/656,567

(22) Filed: Oct. 17, 2019

(65) Prior Publication Data

US 2021/0117821 A1   Apr. 22, 2021

(51) Int. Cl.
*G06N 5/04*  (2023.01)
*G06N 3/084*  (2023.01)

(52) U.S. Cl.
CPC ............... *G06N 5/04* (2013.01); *G06N 3/084* (2013.01)

(58) Field of Classification Search
CPC .................................. G06N 5/04; G06N 3/084
See application file for complete search history.

(56) References Cited

U.S. PATENT DOCUMENTS

2012/0084248 A1   4/2012  Gavrilescu

2013/0345961 A1   12/2013  Leader et al.
2014/0344035 A1*  11/2014  Hewett .............. G06Q 30/0211
                                                       705/14.13
2016/0071126 A1   3/2016  Chang et al.

FOREIGN PATENT DOCUMENTS

CN         109447312         3/2019

OTHER PUBLICATIONS

Chang, H. T., Chang, Y. M., & Tsai, M. T. (2015). ATIPS: automatic travel itinerary planning system for domestic areas. Computational intelligence and neuroscience, 2015. (Year: 2015).*
Roy, S. B., Das, G., Amer-Yahia, S., & Yu, C. (Apr. 2011). Interactive itinerary planning. In 2011 IEEE 27th International Conference on Data Engineering (pp. 15-26). IEEE. (Year: 2011).*

(Continued)

*Primary Examiner* — Ying Yu Chen
*Assistant Examiner* — Lokesha G Patel
(74) *Attorney, Agent, or Firm* — KONRAD RAYNES DAVDA & VICTOR LLP; David W. Victor

(57) ABSTRACT

Provided are a computer program product, system, and method for ranking action sets comprised of actions for an event to optimize action set selection. Information is maintained on actions for a plurality of events. Each action indicates an action value of the action to the user and event weights of the action with respect to a plurality of the events. A determination is made of actions sets having at least one action to perform for the event. For each determined action set, a rank of the action set is calculated as a function of the action value for each action in the action set and an event weight of the action with respect to the event. At least one action set is presented to the user for consideration. In response to receiving user feedback, an adjusted rank is set for at least one of the presented action sets.

15 Claims, 6 Drawing Sheets

(56) References Cited

OTHER PUBLICATIONS

Herzog, D., Massoud, H., & Wörndl, W. (Jul. 2017). Routeme: a mobile recommender system for personalized, multi-modal route planning. In Proceedings of the 25th Conference on User Modeling, Adaptation and Personalization (pp. 67-75). (Year: 2017).*
Anonymous, "Learning Weights for Smart Navigation Planning", Ip.com No. IPCOM000252350D, Jan. 5, 2018, 40 pp.
IBM Corporation, "Alert and Advisory Governance Method and System", Ip.com No. IPCOM000179048D, Feb. 5, 2009, 3 pp.
Wikipedia, "Learning to Rank", [online], Last Edited Sep. 22, 2019, [Retrieved on Oct. 6, 2019], Retrieved from the Internet at <URL: https://en.wikipedia.org/wiki/Learning_to_rank>, 6 pp.
Zhao, Y., "Route Planning and Guidance Incorporating Train Schedules", Ip.com No. IPCOM000008902D, Jan. 1, 1999, 3 pp.
Machine Translation for CN Publication No. 109447312, dated Mar. 8, 2019, 26 pp.

* cited by examiner

Action Information

Action Set (Route) information

RANKING ACTION SETS COMPRISED OF ACTIONS FOR AN EVENT TO OPTIMIZE ACTION SET SELECTION

BACKGROUND OF THE INVENTION

1. Field of the Invention

The present invention relates to a computer program product, system, and method for ranking action sets comprised of actions for an event to optimize action set selection.

2. Description of the Related Art

Current smartphone and desktop applications allow for suggestions on locations for a user to visit while travelling to a location on a route, such as a mapped route to a destination. However, these suggestions may be based on tagged locations on the route or store locations that advertise to be shown on user routes to a destination.

There is a need in the art for improved techniques for determining actions for a user to perform while proceeding to an event that optimizes selection of the actions based on user needs and previous activities.

SUMMARY

Provided are a computer program product, system, and method for ranking action sets comprised of actions for an event to optimize action set selection. Information is maintained on actions for a user to take with respect to a plurality of events Each action indicates an action value of the action to the user and event weights of the action with respect to a plurality of the events. A determination is made of actions sets. Each action set indicates at least one action to perform for the event. Each of the action sets indicates a different at least one action for the event. For each action set of the determined action sets, a rank of the action set is calculated as a function of the action value for each action in the action set and an event weight of the action with respect to the event. At least one action set is presented to the user for consideration of actions in the action set to perform for the event based on the ranks of the action sets. In response to receiving user feedback with respect to at least one of the determined action sets, an adjusted rank is set for at least one of the determined action sets.

DETAILED DESCRIPTION

Described embodiments provide improvements to computer technology for determining action sets for a user event by maintaining action event weights and values used to calculate ranks for action sets of actions, such as actions to perform on a route to an event or a collection of actions for an event. Action sets are presented to a user for consideration based on the ranks of the action sets. Further, in response to receiving user acceptance or rejection of a presented action set, the action event weights and action values may be adjusted using machine learning techniques based on the adjusted ranks resulting from user feedback.

With the described embodiments, a user's preference and needs for actions are quantified to provide insights and actions for a user to perform that will be most beneficial for a scheduled event, such as a trip or journey on a route. Further, with described embodiments using quantifications of actions for a user for an event, the user's agenda for an event is optimized to help the user to spend less time to complete necessary tasks by finding the most optimal way between locations considering a user's calendar of events, time, purpose/need and normal habits.

Figure 1:
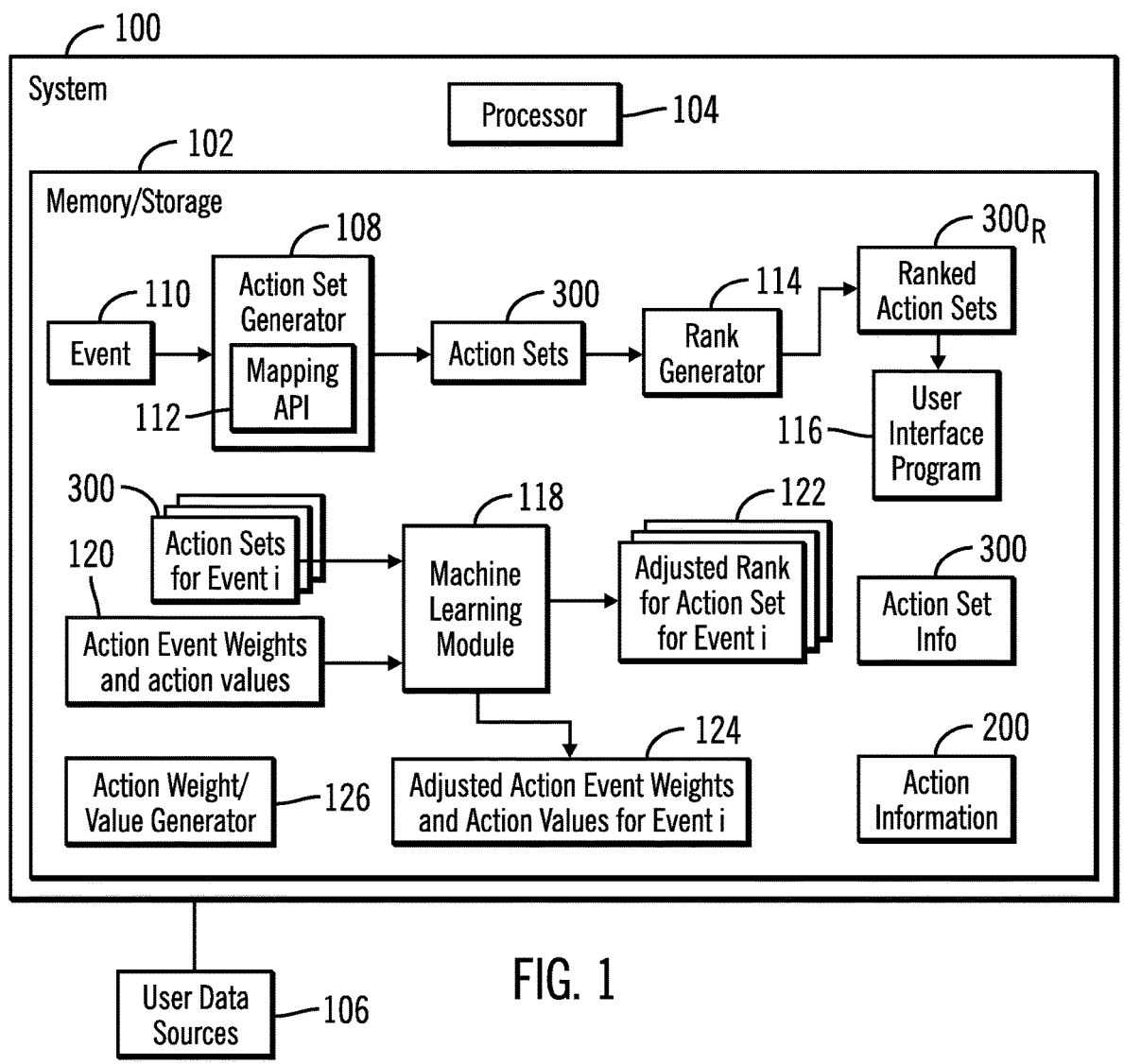
FIG. 1 illustrates an embodiment of a system for presenting action sets of actions for a user for an event.

FIG. 1 illustrates an embodiment of a system 100 in which embodiments are implemented. The system 100 includes a memory/storage 102 and a processor 104 or processor complex of one or more processor cores for executing programs in the memory 102. The system 100 is coupled to user data sources 106, such as social network/media sites in which a user of the system 100 participates, calendar, email program, etc., which may be stored locally in the system 100 or on a network provided by a network service provider. The memory/storage 102 includes an action set generator 108 that receives information on an event 110, comprising a scheduled event or activity for the user. The action set generator 108 calls mapping Application Programming Interfaces (APIs) 112 to call mapping software functions to determine routes between a user current location and a location of the event. The action set generator 108 determines actions indicated in action information 200 that may be performed on the different routes to the event 110, such as stopping at a store to purchase something related to the event, remembering to take things or do things before the event, etc.

The action set generator 108 generates action sets 300 of actions that can be performed on the routes, where one action set $300_i$ provides a unique set of actions to perform on one of the routes between the user location and the event 110. Action sets may also be generated for events that are not related to a route to the event, such as a collection of actions to perform in anticipation of the event. A rank generator 114 receives the action sets 300 and ranks them according to a formula based on weights for the events and values for the actions in the action sets 300 in action information 200 maintained for the actions. The generated ranks provide a relative ranking of the action sets 300R, such as a confidence level indicating a best route or action set of actions to perform in route to or in anticipation of the event 110. The rank generator 114 outputs ranked action sets 300R, which means the generated rank is added for the action sets.

The ranked action sets 300R are then provided to a user interface program 116 to select one or more of the highest ranked action sets 300R to render to the user in a user interface presented to the user, such as on a display screen of the system 100 or outputted via speakers or other sensory means. The user interface program 116 may receive user selection of one of the presented action sets $300_i$. The user interface program 116 receives information on the user acceptance or not accepting a presented action set and stores the user feedback in the action set history information 300. The user may also provide user adjusted rankings for the presented action sets $300_i$, which may also be stored in the action set information $300_i$. This generated action set information 300I provides a history of action set information, rank, historical ranks, and user feedback that may be used to retrain a machine learning module 118 to adjust the action event weights and values.

An action weight/value generator 126 may process information in the user data sources 106 to determine initial measurements of action event weights and action values for different actions or update previously calculated measurements. The action weight/value generator 126 may include a natural language processor (NLP) and machine learning algorithms to determine weights of different actions the user performs or mentions performing based on processing user data sources 106.

The machine learning module 118 may receive as input the generated action sets for event i 300 and the action event weights and action values 120 that are used to train the machine learning module 118 to produce as output the adjusted ranks 122, based on user feedback, for the action sets for event i 300. As part of training the machine learning module to produce the adjusted ranks 122 for the action sets for event i, the machine learning module 118 outputs adjusted action weights and action values for event i 124 that may be used to update the action information 200. In this way, the machine learning module 118 is used to adjust the action event weights and action values that may be used to produce more accurate and optimal ranks for the actions sets for an event.

The machine learning module 118 may utilize learning to rank or machine-learned ranking (MLR) techniques to adjust the action event weights and action values to produce adjusted ranks for action sets for an event.

In one embodiment, the machine learning modules 118, 126 may comprise an artificial neural network programs. The neural network may be trained using backward propagation to adjust weights and biases at nodes in a hidden layer to produce the computed output, such as the adjusted ranks 122 and adjusted action weights and action values for event i 124. In backward propagation used to train a neural network machine learning module, biases at nodes in the hidden layer are adjusted accordingly to produce the desired outcome based on specified confidence levels. Backward propagation may comprise an algorithm for supervised learning of artificial neural networks using gradient descent. Given an artificial neural network and an error function, the method may calculate the gradient of the error function with respect to the neural network's weights and biases. The machine learning module 118 may use different techniques such as decision tree learning, association rule learning, neural network, inductive programming logic, support vector machines, Bayesian network, etc.

FIG. 1 shows arrows to illustrate the program flow of processing and data among the program components 108, 114, 116, 118, 126 executing in the memory 102.

The system 100 may store program components, such as 108, 114, 116, 118, 126 and data objects, such as 200, 300 in a memory/storage 102, which may comprise one or more memory and/or storage devices known in the art, such as a solid state storage device (SSD) comprised of solid state electronics, NAND storage cells, EEPROM (Electrically Erasable Programmable Read-Only Memory), Dynamic Random Access Memory (DRAM), flash memory, flash disk, Random Access Memory (RAM) drive, storage-class memory (SCM), Phase Change Memory (PCM), resistive random access memory (RRAM), volatile and non-volatile Direct In-Line Memory Modules (DIMMs), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor. The memory/storage 102 thus may comprise a suitable volatile or non-volatile memory devices, including those described above.

Generally, program modules, such as the program components 108, 114, 116, 118, 126 may comprise routines, programs, objects, components, logic, data structures, and so on that perform particular tasks or implement particular abstract data types. The program components and hardware devices of the system 100 of FIG. 1 may be implemented in one or more computer systems, where if they are implemented in multiple computer systems, then the computer systems may communicate over a network.

The system 100 may comprise different types of computing devices, such as a smartphone, laptop computer, desktop computer, wearable computing device, etc.

The program components 108, 114, 116, 118, 126 may be accessed by the processor 104 from the memory 102 to execute. Alternatively, some or all of the program components 112, 114, 116, 118, 126, 132 may be implemented in separate hardware devices, such as Application Specific Integrated Circuit (ASIC) hardware devices.

The functions described as performed by the programs 108, 114, 116, 118, 126 may be implemented as program code in fewer program modules than shown or implemented as program code throughout a greater number of program modules than shown.

Figure 2:
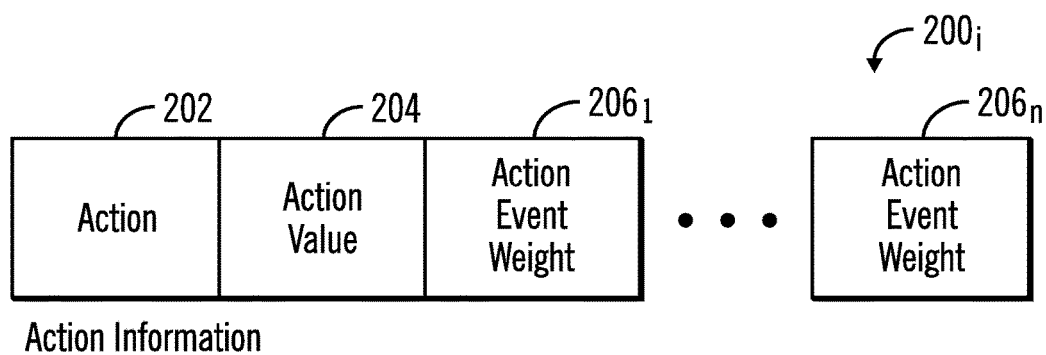
FIG. 2 illustrates an embodiment of action information for actions including action event weights and action values for actions for a user to perform for an event.

FIG. 2 illustrates an embodiment of an instance of action information $200i$ for an action, and includes an action 202; an action value 204 indicating a general value of the action based on processed user information and one or more action event weights $206_1 \ldots 206_n$ indicating an importance of an action with respect to an event. For instance, an action such as to purchase a gift may be highly relevant to an event such as a birthday party and less relevant to other events, such as a business meeting.

Figure 3:
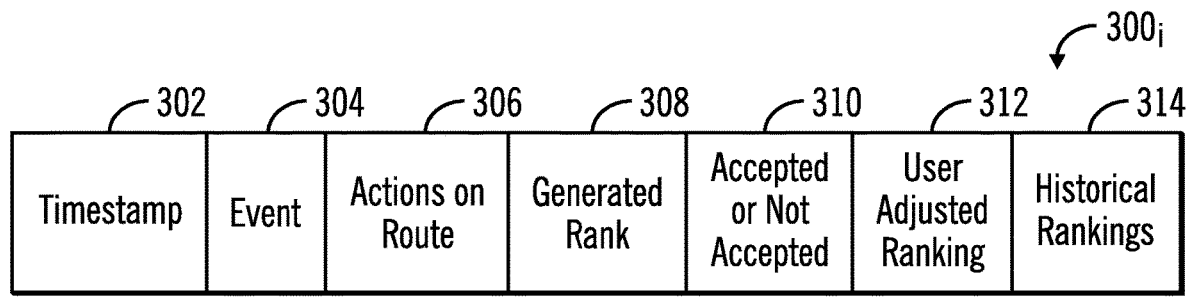
FIG. 3 illustrates an embodiment of information in an action set of actions to generate for an event for the user, including information on a ranking of the action set relative to other action sets for the event.

FIG. 3 illustrates an embodiment of an instance of action set or route information $300_i$ for a generated action set and includes: a timestamp 302 when generated for an event 304; the actions on the route 306 or just the actions if there is no route; a generated rank 308 for the actions generated by the rank generator 114; indication of accepted or not accepted 310, or a third value if not presented to the user and considered; a user adjusted ranking 312 if the user provided an adjusted ranking; and historical rankings 314 calculated for the event 304 at different times.

Figure 4:
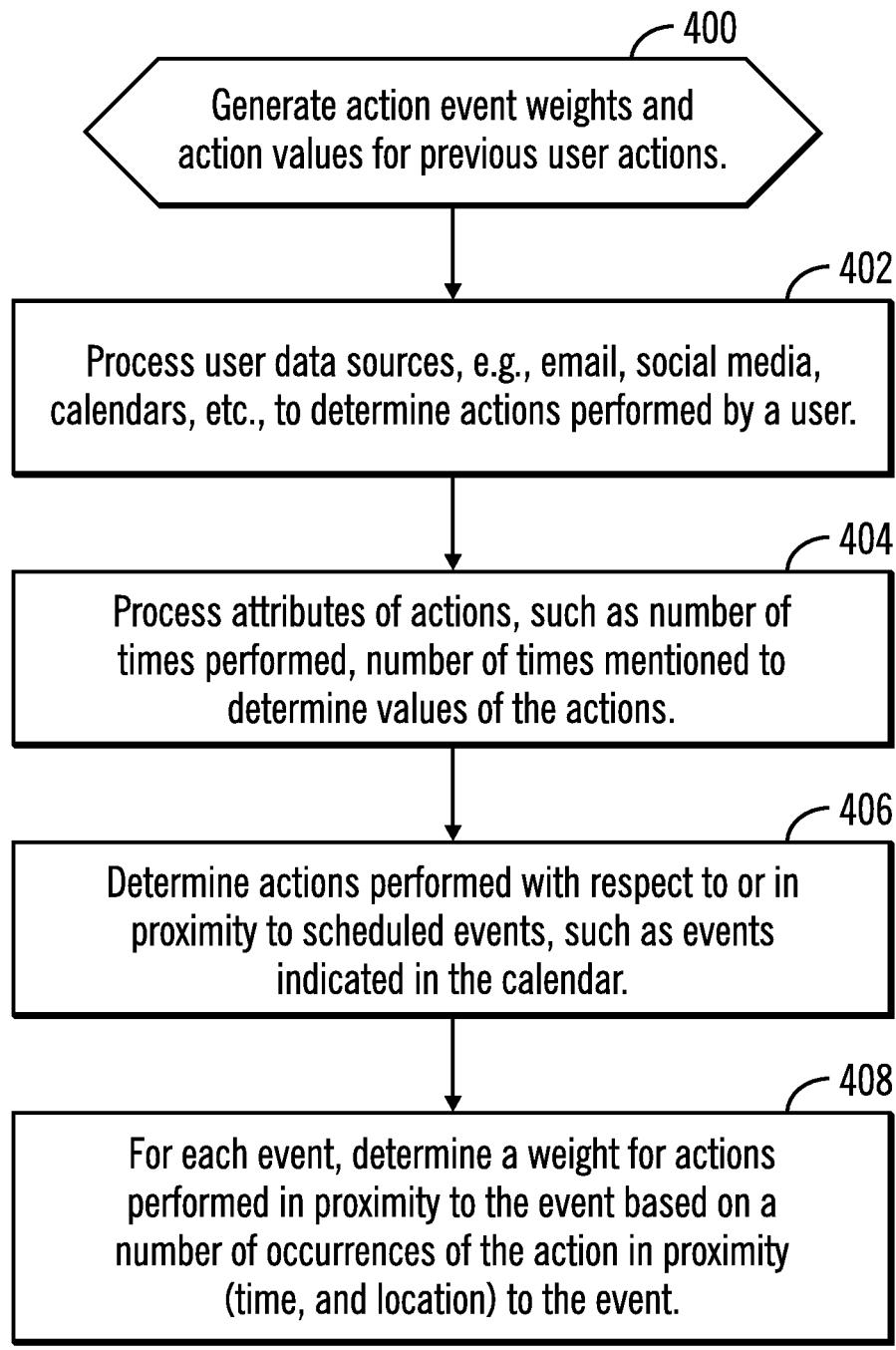
FIG. 4 illustrates an embodiment of operations to generate action event weights and action values for actions based on user activity and profile information.

FIG. 4 illustrates an embodiment of operations performed by the action weight/value generator 126 to generate initial or updated values 204 and action event weights 206$_i$ for actions. Upon initiating (at block 400) operations to generate action values 204 and action event weights 206$_i$, the action weight/value generator 126 processes (at block 402) user data sources 106, such as email, social media, calendars, map routes taken, activities tracks by a smartphone or mapping program, medical information if permitted, etc., to determine actions 200$_i$ performed by the user. The action weight/value generator 126 may use natural language processing (NLP) techniques to determine actions mentioned throughout the different user data sources 106. Attributes of the determined actions, such as number of times an action is performed, number of times mentioned, time spent performing the action, are processed (at block 404) to determine values 204 for the actions 200$_i$, indicating an importance of the action to the user independent of a particular event. The action weight/value generator 126 further determines (at block 406) actions performed with respect to or in proximity to scheduled events, such as events indicated in a user calendar or email. For each event, a determination is made (at block 408) of a weight 206$_i$ for actions performed in proximity to the event based on a number of occurrences of the action in proximity (time, and location) to the event.

The action weight/value generator 126 may comprise a machine learning module that is trained based on feedback of the values 204 and weights 206$_i$ assigned to the actions to improve the calculation of how weights and values are assigned. If the action weight/value generator 126 is scanning the user data sources 106 periodically to update weights and values, the weights and values determined during these updates may be aggregated with previously determined weights and values for the actions 200$_i$, such as an averaging or other data smoothing operation.

Figure 5:
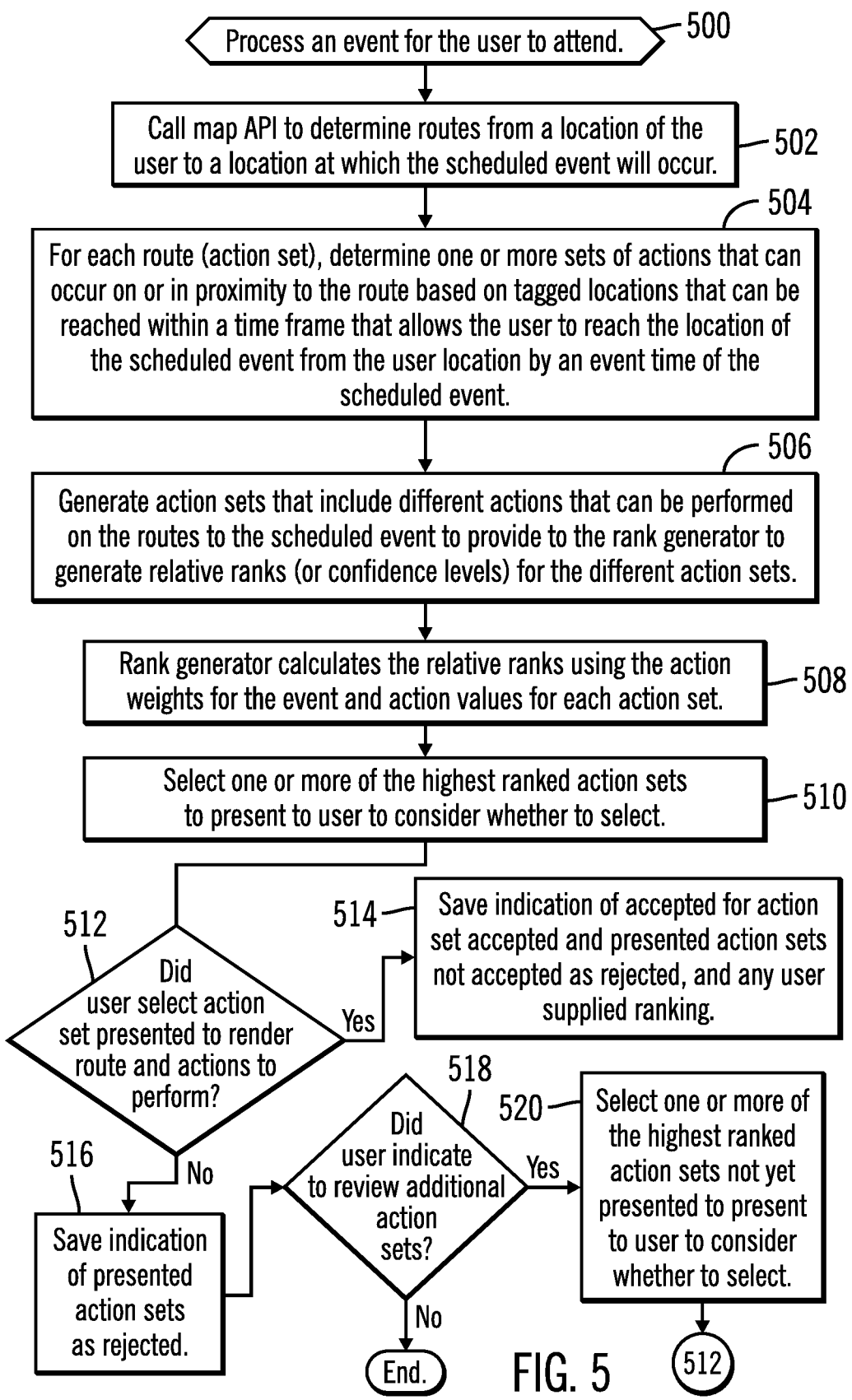
FIG. 5 illustrates an embodiment of operations to determine and rank action sets of user actions for an event.

FIG. 5 illustrates an embodiment of operations performed by the action set generator 108 and mapping API 112, rank generator 114, and user interface program 116 to generate and rank action sets 300$_i$ to present to a user to select to provide actions for an event 110 for the user to attend, which may or may not be on a map route from a user location to an event location. Upon processing (at block 500) an event 110 for the user to attend, the action set generator 108 calls (at block 502) map API 112 to perform map functions to determine routes between a location of the user and a location at which the scheduled event 110 will occur. For each route on which actions can be performed, the action set generator 108 determines (at block 504) one or more sets 300$_i$ of actions 306 that can occur on or in proximity to the route based on tagged locations that can be reached within a time frame that allows the user to reach the event location from the user location by an event time of the scheduled event. Action sets 300$_i$ are generated (at block 506) that include different actions 306 that can be performed on the routes to the scheduled event to provide to the rank generator 114. The actions considered for the action sets 300 may comprise actions having an event weight 306$_i$ for the event that exceeds a threshold weight value. The rank generator 114 calculates (at block 508) relative ranks 308 (or confidence levels) for the different action sets 300, providing ranked action sets 300R, comprising action sets 300$_i$ with the rank value 308 set. The rank values 308 indicate relative ranks of the action sets 300 providing actions on the route for the event 304 having the most value to the user.

In one embodiment the rank of an event j (R(E$_j$)), such as a route or other collection of actions, having a set of n actions (a$_i$), where each action (a$_i$) has a value (V) 204 and action event weight (W) 206$_j$ may be calculated as:

$$R(Ej) = (\Sigma_{i=1}^{n} V(a_i) * W(a_i))/n$$

The user interface program 116 or other component may select (at block 510) one or more of the highest ranked action sets to present to user on a display screen of the system to consider whether to select. If (at block 512) the user selected a presented action set 300$_i$ of a route (or other collection of actions) to perform, then indication of accepted 310 is made (at block 514) for the accepted action set 300$_i$ and rejected 310 is indicated for any other presented action sets 300$_j$ not accepted. Further, any user supplied ranking is saved (at block 514) in field 312. If (at block 512) the user did not select any of the presented action sets 300$_i$ or routes, then indication of rejected 310 is made (at block 516) for the presented action sets 300k.

If (at block 518) the user indicated to review additional action sets 300$_i$, then the user interface program 116 selects (at block 520) one or more of the highest ranked action sets 300$_i$ not yet presented to present to the user to consider by returning to block 512. If (at block 518) the user did not indicate to review additional action sets 300$_i$, then control ends.

With the embodiment of FIG. 5, the system determines action sets comprising collection of actions for a scheduled event, which may be along a geographical route between a location of a user and location of the event. To optimize action selection, a rank generator 114 may rank the different action sets based on an importance value and action event weights of the actions included in the action sets. The system may then present the highest ranked action sets to the user to consider. This optimizes user time by only presenting the highest ranked action sets for consideration. Further, feedback on whether the user accepted or did not accept presented action sets is recorded to use to retrain the event weights and values for the actions to provide more accurate ranking when considering the actions in different action sets for the same or different events.

The operations of FIG. 5 may address the following use cases. If a user has an event to travel from one destination to another, then the route may not be changed, however actions for the journey along the travel route may be determined that provide an optimal ranking of action sets for the journey. For instance, if a user is going from a colder region to hotter region via flight, the operations of FIG. 5 may suggest actions to take light clothes, sun screen, etc., which will help the user reduce the weight of the bag to avoid airline bag fees. In certain embodiments, the system may scan through items in a user bag and based on the highest ranked action set of items to bring may suggest items that should be removed, i.e., not similar to items in actions in the highest ranked action sets, and what items should be added. By way of another example, if the user is attending an event by car, such as a party, then the set of actions may include actions to purchase a gift or item related to the event to which the user is traveling, such as a gift for a birthday party.

In a yet further example, if a user has a medical condition that can be aggravated when going to an event location having certain weather or environment, then the determined action sets can include actions related to health activities, which may have a higher weight for certain events that may trigger the condition treated by the medication.

Figure 6:
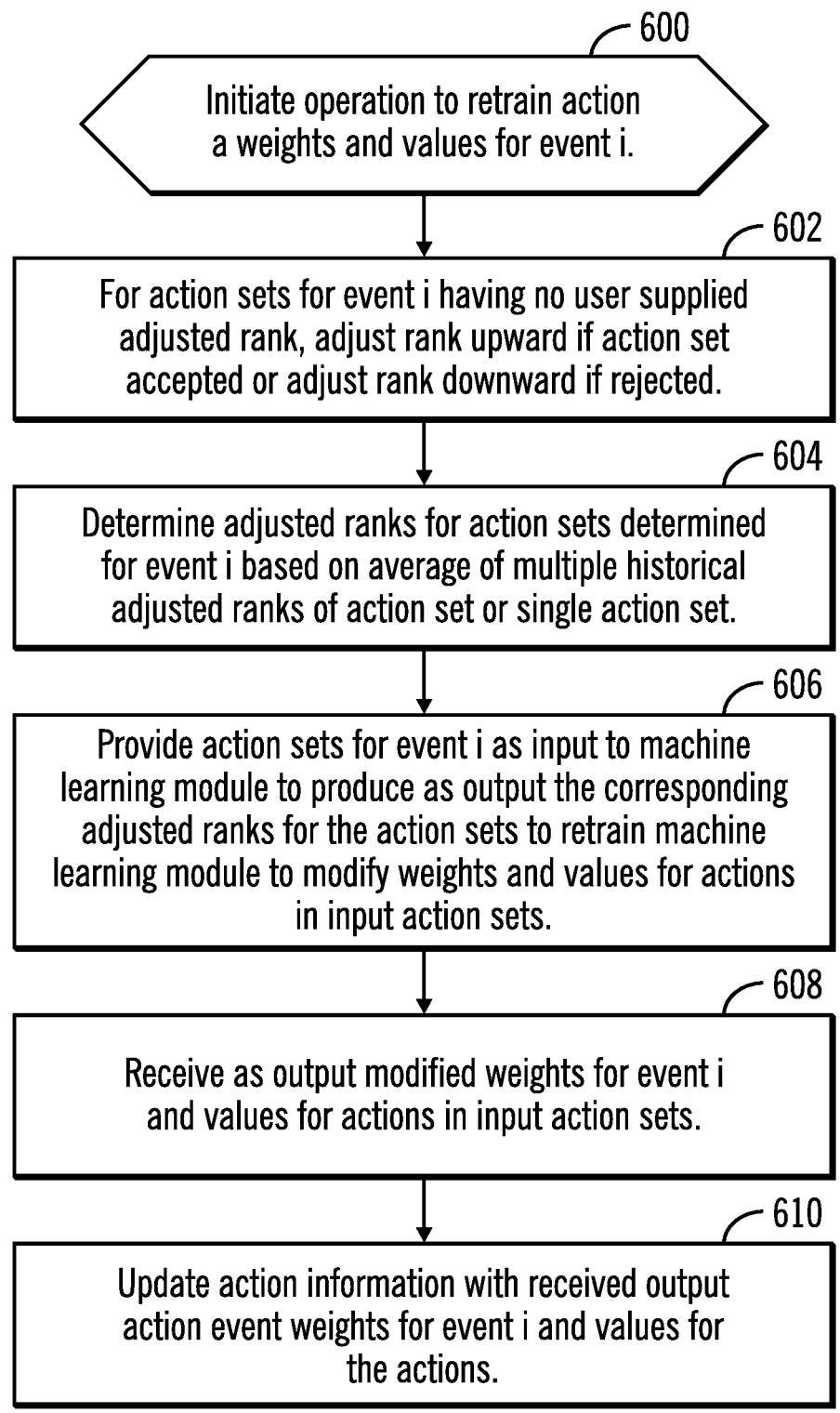
FIG. 6 illustrates an embodiment of operations to retrain a machine learning module to produce adjusted ranks for action sets for an event and adjust the action event weights and action values to produce the adjusted ranks for the action sets for the event.

FIG. 6 illustrates an embodiment of operations performed by the machine learning module 118 to adjust values 204 and event weights 206$_i$ for actions 200k. Upon initiating (at block 600) operations to retrain action event weights 206$_i$ and values 204 for an event i, for action sets 300$_i$ for event i having no user adjusted ranking 312, the machine learning module 118 or other component, adjusts (at block 602) the rank 308 upward, such as by a percentage, if the action set 300$_i$ indicated as accepted in field 310 or downward by a percentage if indicated as rejected in field 310. In a further embodiment, adjusted ranks for action sets 300$_i$ may be determined (at block 604) for event i based on average of multiple historical adjusted ranks 314 of action set 300$_i$ or a single most recent adjusted rank. For instance, the historical adjusted rank 314 of an action set 300$_i$ may be calculated as an average of the last n adjusted ranks of the action set to reflect upward or downward trends in the rank based on a number of adjusted ranks. The action sets 300$_i$ for event i as well as the action event weights and action values 120 in the action sets 300$_i$ may be provided (at block 606) as input to the machine learning module 118 to produce as output the corresponding adjusted ranks 122 for the action sets 300$_i$ to retrain the machine learning module 118 to modify action event weights 206$_i$ and values 204 for actions in the input action sets 300$_i$ to produce the adjusted ranks. The adjusted action event weights and action values for event i are received (at block 608) as output 124. The action information 200$_i$ for the actions in the action sets 300 is updated (at block 610) with the received output 124 event weights and values for the actions in the action sets 300 for event i.

With the embodiment of FIG. 6, a machine learning module 118 is used to adjust the action event weights for an event and action values to produce adjusted rank values, based on user feedback, for input action sets for an event to optimize the action event weights 206$_i$ and action values 204 to produce the new adjusted ranks. This allows continual adjusting of the input parameters (action event weights 206$_i$ and action values 204) used to determine the relative rankings of action sets for an event based on user feedback as to the relative value of ranked action sets. This allows the action event weights 206$_i$ and values 204 to be continually updated to produce relative ranks for action sets for events based on user feedback as to the relative ranks of action sets.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
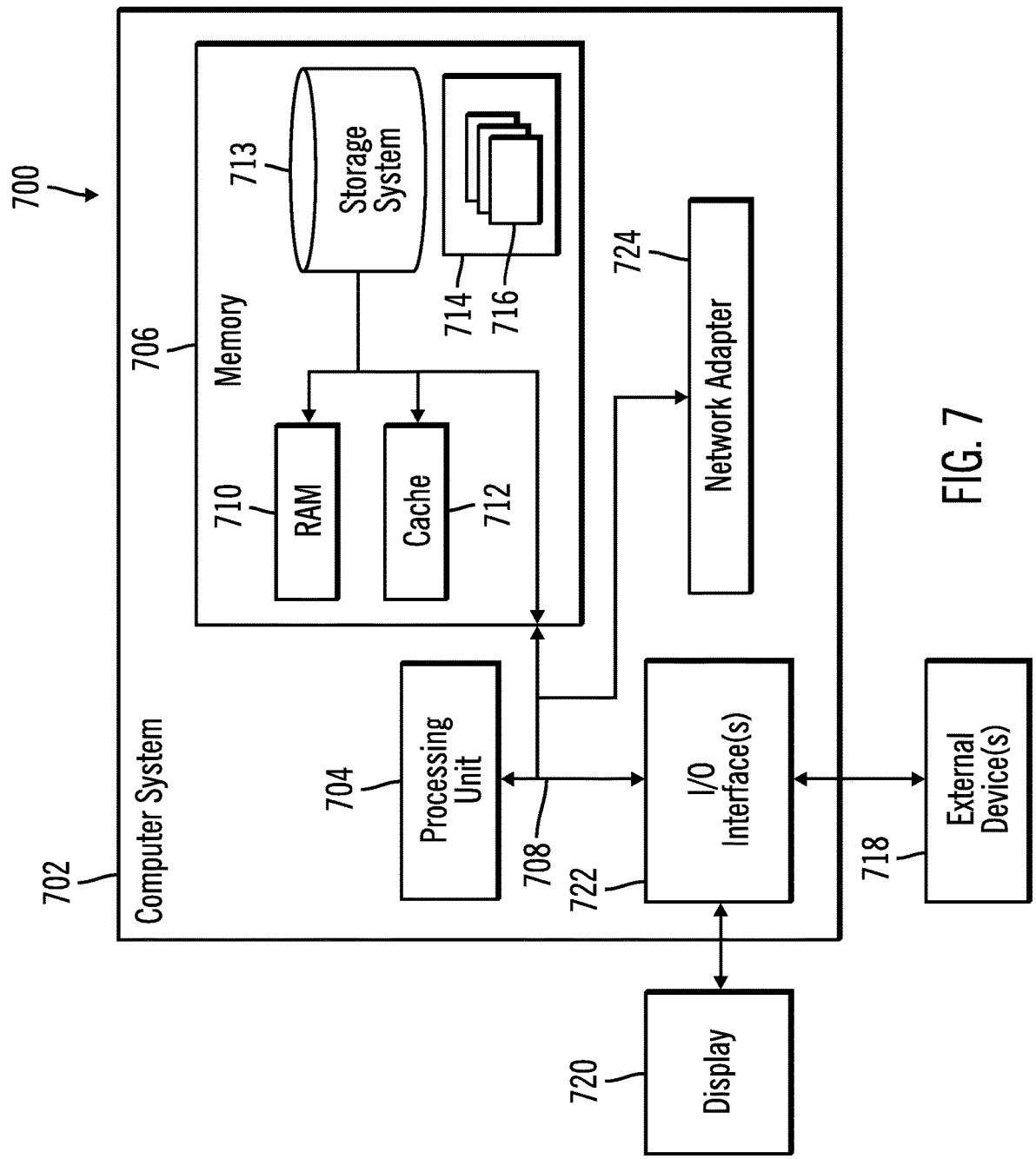
FIG. 7 illustrates a computing environment in which the components of FIG. 1 may be implemented

The computational components of FIG. 1, including the system 100, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining actions to take for an event, the computer program product comprising a computer readable storage medium having computer readable program code embodied therein that is executable to perform operations, the operations comprising:

maintaining action information on actions for a user to take with respect to a plurality of events, wherein the action information indicates action values of the actions to the user and event weights of the actions with respect to a plurality of the events, wherein an event weight indicates an importance of an action with respect to an event;

determining actions sets indicating actions to perform for the event, wherein the determined action sets indicate different actions to take for the event, and wherein a plurality of action sets each include a plurality of actions;

calculating a rank of each of the determined action sets, wherein, for each determined action set of the determined action sets, the rank is calculated as a function of action values for actions in the determined action set and event weights of the actions in the determined action sets with respect to the event;

selecting action sets of the determined action sets based on calculated ranks of the determined action sets to present to the user;

in response to receiving user feedback with respect to the selected action sets, setting adjusted ranks for the selected action sets;

retraining a machine learning module to produce adjusted ranks for the selected action sets, adjusted action event weights for the actions in the selected action sets, and adjusted action values for the actions in the selected action sets for the event based on input action event weights and input action values for the actions in the selected action sets; and updating the action information for the actions in the selected action sets with the adjusted action event weights and the adjusted action values outputted from the machine learning module.

2. The computer program product of claim 1, wherein the selecting action sets to present to the user comprises selecting the determined action sets having highest rankings, wherein the operations further comprise:

receiving a user request to review additional of the determined action sets; and presenting to the user at least one of the determined action sets not yet presented to the user to consider for acceptance.

3. The computer program product of claim 1, wherein the operations further comprise:

in response to the user not accepting a selected action set of the selected action sets, setting an adjusted rank by decreasing a calculated rank for the not accepted selected action set with respect to the event.

4. The computer program product of claim 1, wherein the operations further comprise:

determining the adjusted ranks for the selected action sets based on an aggregate of calculated ranks for the selected action sets generated for the event at multiple times.

5. The computer program product of claim 1, wherein the operations further comprise:

processing user profile information, including patterns of actions performed by the user, information generated by the user with respect to actions, and information on actions the user performed, to determine action values independent of events and to determine whether the actions were performed in proximity to user scheduled and attended events; and generating event weights for the actions with respect to the events based on a number of occurrences of the actions in proximity to the events.

6. The computer program product of claim 5, wherein the processing the user profile information to determine action values independent of the events further comprises:

determining action values based on a number of instances the action is indicated as performed by processing at least one of user communications, postings in social media, email, and activities tracked by a smartphone and mapping program within a geographical area.

7. The computer program product of claim 1, wherein the determining the action sets comprises determining actions for the event having event weights with respect to the event that exceed a threshold weight.

8. The computer program product of claim 1, wherein the function comprises summing for each action in the determined action set a product of an action value and an event weight of the action with respect to the event.

9. The computer program product of claim 1, wherein the determining the action sets comprises:
    calling a map function to determine routes between a location of the user and a location at which the event will occur; and
    determining actions that can occur with respect to the determined routes, wherein the actions in the determined action sets comprise actions that can occur with respect to the determined routes.

10. A system for determining actions to take for an event, comprising:
    a processor; and
    a computer readable storage medium having computer readable program code embodied therein that when executed by the processor performs operations, the operations comprising:
        maintaining action information on actions for a user to take with respect to a plurality of events, wherein the action information indicates action values of the actions to the user and event weights of the actions with respect to a plurality of the events, wherein an event weight indicates an importance of an action with respect to an event;
        determining actions sets indicating actions to perform for the event, wherein the determined action sets indicate different actions to take for the event, and wherein a plurality of action sets each include a plurality of actions;
        calculating a rank of each of the determined action sets, wherein, for each determined action set of the determined action sets, the rank is calculated as a function of action values for actions in the determined action set and event weights of the actions in the determined action sets with respect to the event;
        selecting action sets of the determined action sets based on calculated ranks of the determined action sets to present to the user;
        in response to receiving user feedback with respect to the selected action sets, setting adjusted ranks for the selected action sets;
        retraining a machine learning module to produce adjusted ranks for the selected action sets, adjusted action event weights for the actions in the selected action sets, and adjusted action values for the actions in the selected action sets for the event based on input action event weights and input action values for the actions in the selected action sets; and
        updating the action information for the actions in the selected action sets with the adjusted action event weights and the adjusted action values outputted from the machine learning module.

11. The system of claim 10, wherein the operations further comprise:
    processing user profile information, including patterns of actions performed by the user, information generated by the user with respect to actions, and information on actions the user performed to determine action values independent of events and to determine whether the actions were performed in proximity to user scheduled and attended events; and
    generating event weights for the actions with respect to the events based on a number of occurrences of the actions in proximity to the events.

12. The system of claim 10, wherein the determining the action sets comprises:
    calling a map function to determine routes between a location of the user and a location at which the event will occur; and
    determining actions that can occur with respect to the determined routes, wherein the actions in the determined action sets comprise actions that can occur with respect to the determined routes.

13. A method implemented in a computer system for determining actions to take for an event, comprising:
    maintaining action information on actions for a user to take with respect to a plurality of events, wherein the action information indicates action values of the actions to the user and event weights of the actions with respect to a plurality of the events, wherein an event weight indicates an importance of an action with respect to an event;
    determining actions sets indicating actions to perform for the event, wherein the determined action sets indicate different actions to take for the event, and wherein a plurality of action sets each include a plurality of actions;
    calculating a rank of each of the determined action sets, wherein, for each determined action set of the determined action sets, the rank is calculated as a function of action values for actions in the determined action set and event weights of the actions in the determined action sets with respect to the event;
    selecting action sets of the determined action sets based on calculated ranks of the determined action sets to present to the user; and
    in response to receiving user feedback with respect to the selected action sets, setting adjusted ranks for the selected action sets;
    retraining a machine learning module to produce adjusted ranks for the selected action sets, adjusted action event weights for the actions in the selected action sets, and adjusted action values for the actions in the selected action sets for the event based on input action event weights and input action values for the actions in the selected action sets; and
    updating the action information for the actions in the selected action sets with the adjusted action event weights and the adjusted action values outputted from the machine learning module.

14. The method of claim 13, further comprising:
    processing user profile information, including patterns of actions performed by the user, information generated by the user with respect to actions, and information on actions the user performed to determine action values independent of events and to determine whether the actions were performed in proximity to user scheduled and attended events; and
    generating event weights for the actions with respect to the events based on a number of occurrences of the actions in proximity to the events.

15. The method of claim 13, wherein the determining the action sets comprises:
    calling a map function to determine routes between a location of the user and a location at which the event will occur; and
    determining actions that can occur with respect to the determined routes, wherein the actions in the determined action sets comprise actions that can occur with respect to the determined routes.

\* \* \* \* \*